Sept. 4, 1928.  J. T. JANETTE  1,682,789
CONTROLLING APPARATUS
Filed July 30, 1923
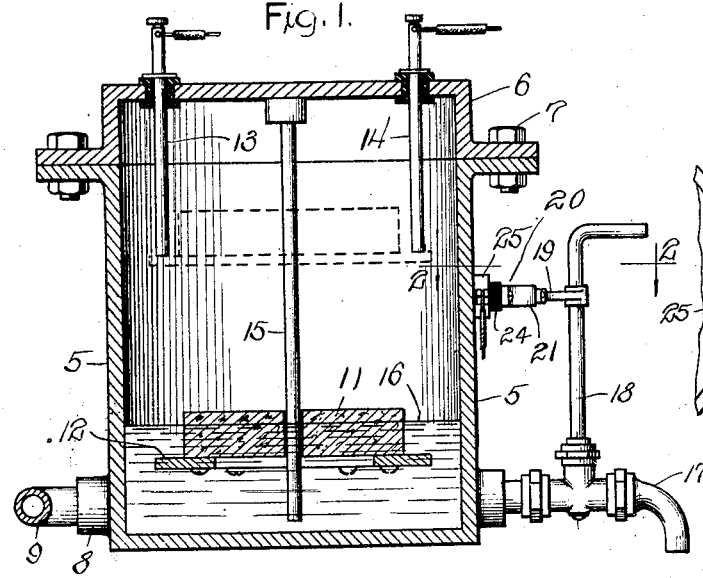
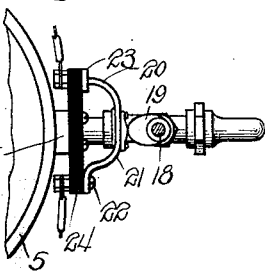
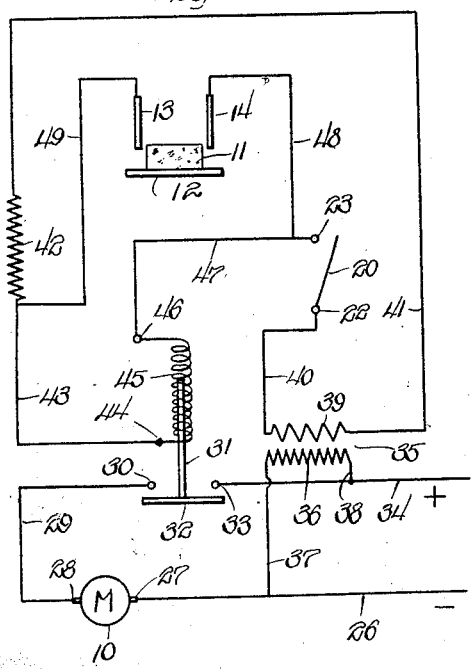
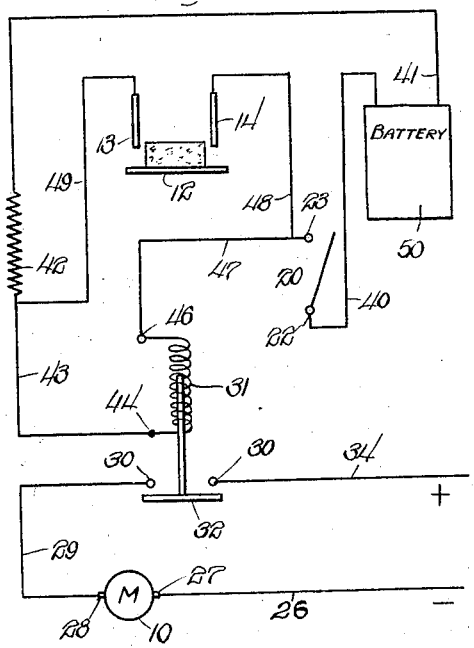
Witness:
W. K. Olson
Inventor:
John T. Janette
By Glenn S. Noble  Atty Patented Sept. 4, 1928.

1,682,789

UNITED STATES PATENT OFFICE.

JOHN T. JANETTE, OF CHICAGO, ILLINOIS.

CONTROLLING APPARATUS.

Application filed July 30, 1923. Serial No. 654,677.

This invention relates to controlling apparatus having certain automatic features and adapted to regulate or control the running of a motor and more particularly to a device or apparatus of this character which is especially adapted for use in connection with oil burners such as are adapted for heating boilers, furnaces or the like. In heating systems of this character it is necessary or desirable to provide means for stopping the motor in the event that the burner has stopped burning and oil is still flowing. The present invention provides means whereby the excess or overflow oil will actuate stopping mechanism to stop the motor and thereby prevent the further pumping of the oil to the burner. The invention also includes other features and details of construction which will be described more fully hereinafter.

The objects of this invention are to provide an improved automatic controlling system for motors or the like; to provide a controlling system having a tank for liquid and means adapted to be actuated by a float for opening and closing an electric circuit; to provide an overflow tank having a drain cock with a switch cooperating therewith whereby the switch will be opened when the cock is opened; and to provide certain novel features in the details of construction as well as in the general plan of an apparatus of this character.

In the accompanying drawings illustrating this invention;

Figure 1 is a sectional view of a tank or receptacle and parts associated therewith which tank may for convenience be designated as an overflow tank;

Figure 2 is a detail plan view taken on the line 2—2 of Figure 1;

Figure 3 is a diagrammatic view showing the general wiring diagram; and

Figure 4 is a view similar to Figure 3 showing a slight modification.

The tank 5 as shown in these drawings may be of any desired size or shape and is preferably provided with a top 6 secured thereto by means of bolts 7. This tank has an inlet 8 for receiving a pipe 9 which leads from any source of supply that is to furnish liquid for operating the device. When the device is to be used in connection with oil burner systems, this pipe leads from the combustion chamber or box into which the fuel oil is pumped by means of a motor such as the motor indicated at 10.

Heretofore switches have been operated for this purpose by the downward movement of a drip pan arranged to catch the excess oil but these devices have been found objectionable as articles may be placed under the pan which prevents its movement or the pan may be removed and if the pan is made so that it can not be readily removed it is difficult to pour the oil from the same when the motor is to be started.

In accordance with the present invention the overflow or excess oil from the burner or combustion chamber goes into the receptacle 5 and actuates a float operated switch. The float 11 which may be of any suitable character is shown as being formed of cork and carries a contact ring 12 at the lower side. Two switch terminals 13 and 14 are mounted in the cover 6 and are adapted to be engaged by the switch member or contact member 12 when the float rises to the proper position in the box. A guide stem 15 is also arranged in the center of the box or receptacle for guiding the float 11. This float and its contact member are preferably arranged so that the contacts will be opened and closed under the surface of the oil 16 thereby making an oil switch in the event that oil is the fluid admitted to the box. It will of course be apparent that the device may be actuated by other fluids when used for other purposes and in such case the contacts may be opened and closed above the surface of the fluid if desired.

The fluid may be withdrawn from the tank or receptacle 5 through a cock or faucet 17 having a rotatable handle 18 for opening and closing the same. The handle 18 has a cam 19 mounted thereon for opening and closing a switch 20. A switch blade 21 is secured at one end to a terminal 22 and its opposite end is adapted to engage with a terminal 23 when in closed position. These terminals are mounted on a bar 24 of insulating material which is secured to a lug 25 on the side of the tank 5. The arrangement is such that when the faucet is closed the switch will be closed but when the faucet is open the switch will also be open this switch being in a circuit with the motor or motor controlling devices.

The motor 10 and its circuit as well as the circuit of the controlling devices are shown in Figure 3. A conductor 26 leads from any suitable source of electricity and is connected with one terminal 27 of the motor 10; the other terminal 28 is connected by wire 29 with one terminal 30 of a switch 31 which is preferably of the solenoid type and has a contact member 32 which is adapted to engage with the contact 30 and a second contact 33. A conductor 34 leads from the contact 33 to the source of supply which for convenience may be considered as delivering a current of one hundred and ten volts. A transformer 35 is used for reducing the voltage of the current for the controlling device. The primary coil 36 is connected by means of wires 37 and 38 with the respective conductors 26 and 34. One terminal of the secondary 39 is connected by wire 40 with the terminal 22 of the switch 20. A wire 41 leads from the other terminal of the secondary to a resistance 42 the opposite terminal of this resistance being connected by wire 43 with one terminal 44 of the coil 45 of the solenoid 31. The other terminal 46 of the solenoid coil is connected by wire 47 with the contact 23 of the switch 20. The wire 47 is also connected by a wire 48 with the terminal or switch member 14 in the tank 5. The wire 43 is also connected by a wire 49 with the terminal or switch member 13 in the tank 5.

The operation of the apparatus will be readily understood from Figure 3. When current is supplied through the conductors 26 and 34 and the switch 20 is closed, the transformer 35 will supply current which passes from coil 39 through wire 41, resistance 42, wire 43, solenoid coil 45, wire 47, switch 20 and wire 40 back to the coil 39. This will energize the solenoid 31 causing it to raise the contact 32 and close the circuit between the contacts 30 and 33 thereby closing the circuit to the motor as will be readily understood. The motor will be caused to start and will pump oil until the circuit is again broken. If the burner should go out and oil is admitted into the tank 5 the float 11 will be raised until the switch member or contact ring 12 engages the contacts 13 and 14. This will make a short circuit from wire 43 through wire 49, contact ring 12, contact 14, wire 43 to switch 20, thereby stopping or reducing the supply of the current to the solenoid 45 thereby permitting the armature 32 to drop and break the circuit between the terminals 30 and 33 which will stop the motor 10. When it is desired to again start the system, the valve 17 is opened to draw off the oil from the tank 5 but it will be noted that the handle 18 must be turned to close the valve or cock 17 and the switch 20 in order to close the circuit ready for further operation. On account of this arrangement it is impossible to again start the burner while the valve 17 is open and consequently the tank controlling apparatus must be in normal or proper condition in order to start the burner.

In a modified form of apparatus shown in Figure 4 the transformer 35 is dispensed with, and a battery 50 or other source of electricity is utilized for furnishing current at a lower voltage than the line current for actuating the controlling device. As the connections are the same as shown in Figure 3, further description is not necessary.

While I have described this invention with particular reference to fuel burning systems, it will be apparent that it may be adapted for automatic controlling purposes wherever applicable, and therefore I do not wish to be limited to the particular use herein set forth, except as specified in the following claims, in which I claim:

1. In a controlling apparatus, the combination of a float chamber, an electric switch adapted to be actuated by the float in said chamber, a motor circuit, a relay for controlling said motor circuit, a source of electricity, a controlling circuit including the solenoid of said relay, a short circuit in said controlling circuit for short circuiting said solenoid, which short circuit is opened and closed by said first named switch, a switch in said controlling circuit, a manually operable faucet for draining said chamber, and means for actuating said last named switch by the faucet whereby the switch will be closed when the faucet is closed and opened when the faucet is opened.

2. The combination with a motor, of a source of electric supply, a circuit from the source to the motor, a switch in said circuit, a solenoid for actuating said switch, a circuit for supplying current to said solenoid, a float chamber, a float in said chamber, a switch actuated by said float, connections from the last named switch to the solenoid circuit whereby the solenoid will be shunted when the switch actuated by the float is closed, manually operable means for draining the float chamber and controlling means actuated by said manually operable means whereby the circuit to the motor will remain open until the manually operable means is moved to a predetermined position.

3. The combination of a motor, a circuit for supplying current to said motor, a switch in said circuit, a solenoid actuating said switch, a source of electricity, a circuit from said source to the solenoid, a resistance in said circuit, a short circuit for cutting out said solenoid, an overflow tank, a float in said tank, a switch actuated by the float for controlling the short circuit, a manually operable drain cock for said tank, and controlling means actuated by the cock whereby the circuit to the motor cannot be closed except when the cock is closed.

4. The combination of a motor, a circuit for supplying current to said motor, a relay for controlling said circuit, a source of electric supply, a circuit from said source to the coil of said relay, a float chamber, contacts arranged in said float chamber, connections from said contacts to the last named circuit for short circuiting the relay coil, a float in said chamber, a contact carried by said float adapted to close the circuit between the contacts in the float chamber when the float is raised, a discharge valve for said chamber, a switch in the circuit to the relay coil and means actuated by the valve handle whereby the last named switch will be closed when the valve is closed but will be opened when the valve is opened.

5. A controlling device comprising a receptacle, a cover for said receptacle, contacts extending downwardly through said cover, a float in said receptacle, a guide for said float, a contact member carried by said float and adapted to engage with the first named contacts, a drain cock for said receptacle, a handle for said cock, an electric switch arranged on the side of the receptacle and a cam on said handle for opening and closing the switch.

6. In an oil burning system of the class described, having an electric circuit controlling the operation thereof, a switch located in said circuit, a safety chamber adapted to receive delivered fuel upon failure of ignition, means adapted to operate said switch and thereby stop the operation of said apparatus when a predetermined amount of fuel has entered the safety chamber, and means for draining said safety chamber operating, when in the draining position to cause the circuit to the oil burning system to be broken.

JOHN T. JANETTE.